United States Patent
Morello et al.

(10) Patent No.: US 9,338,492 B2
(45) Date of Patent: May 10, 2016

(54) METHOD FOR REPRODUCING AN AUDIO AND/OR VIDEO SEQUENCE, A REPRODUCING DEVICE AND REPRODUCING APPARATUS USING THE METHOD

(75) Inventors: Alberto Morello, Turin (IT); Massimo Mancin, Turin (IT)

(73) Assignees: RAI Radiotelevisione Italiana S.P.A., Rome (IT); S.I.SV.EL. S.P.A, Turin (IT)

( * ) Notice: Subject to any disclaimer, the term of this patent is extended or adjusted under 35 U.S.C. 154(b) by 1276 days.

(21) Appl. No.: 12/441,211

(22) PCT Filed: Sep. 18, 2007

(86) PCT No.: PCT/IB2007/002689
§ 371 (c)(1),
(2), (4) Date: Mar. 13, 2009

(87) PCT Pub. No.: WO2008/035164
PCT Pub. Date: Mar. 27, 2008

(65) Prior Publication Data
US 2010/0061698 A1  Mar. 11, 2010

(30) Foreign Application Priority Data
Sep. 19, 2006 (IT) .............................. TO2006A0668

(51) Int. Cl.
*H04L 29/06* (2006.01)
*H04N 21/41* (2011.01)
(Continued)

(52) U.S. Cl.
CPC ......... *H04N 21/4126* (2013.01); *H04N 5/4401* (2013.01); *H04N 21/41407* (2013.01);
(Continued)

(58) Field of Classification Search
CPC ............. H04L 1/0002; H04N 7/17318; H04N 21/4384
USPC .................. 386/248, 263–265, 267, 272, 353
See application file for complete search history.

(56) References Cited

U.S. PATENT DOCUMENTS 4,864,620 A * 9/1989 Bialick .......................... 704/207
5,247,363 A * 9/1993 Sun et al. ...................... 348/616
(Continued)

FOREIGN PATENT DOCUMENTS

EP  1 533 974 A1 * 5/2005
EP  1533974  5/2005
(Continued)

OTHER PUBLICATIONS

Stockhammer, Thomas et al., Real-Time Demonstration of MPEG-4 based Video Telephony over Wireless Systems using WiNe2, Oct. 5, 2003, Institute for Communications Engineering, Munich University of Technology, retreived from http://ip.hhi.de/imagecom_G1/assets/pdfs/momuc_2003_2.pdf on Mar. 4, 2012.*
(Continued)

*Primary Examiner* — Carl Colin
*Assistant Examiner* — Gary Lavelle
(74) *Attorney, Agent, or Firm* — Buchanan Nipper

(57) ABSTRACT

The present invention refers to a method for reproducing an audio and/or video sequence, as well as a reproducing device and reproducing apparatus that make use of the method; the method reproduces an audio and/or video sequence by means of a decoder ($D_{av}$) apt to decode said sequence and a buffer (B) connected upstream to said decoder ($D_{av}$) and able to store at least a part of said sequence; the sequence is transmitted by means of a number of data blocks; each of said blocks comprises an audio and/or video information data section and a corresponding error correction data section; such sections are transmitted in different time intervals; the method comprises a transitory operation mode and a steady state operation mode; in the steady state operation mode the correction data of the block (FEC) are applied to the corresponding information data before said information data are supplied to said decoder ($D_{av}$), while in the transitory operation mode the information data of a block are directly supplied to said decoder ($D_{av}$) ignoring the corresponding correction data of said block; the transitory operation mode is used after the audio and/or video sequence has been selected for the reproduction and for a determined time interval; the result is that the reproduction of the sequence takes place immediately after the selection and without waiting for the application of the correction data.

45 Claims, 5 Drawing Sheets

Figure 1:
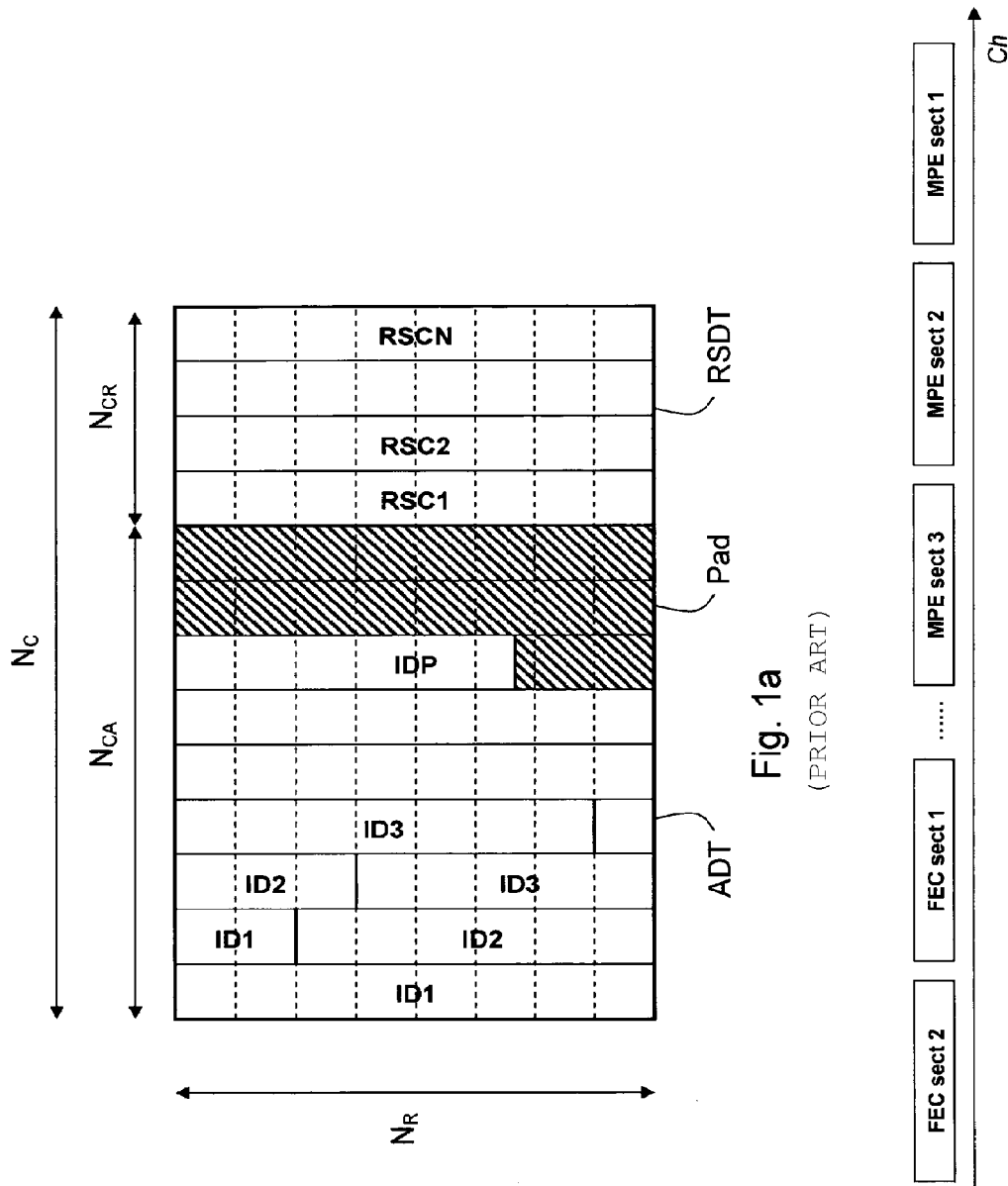

(51) Int. Cl.
*H04N 5/44* (2011.01)
*H04N 21/414* (2011.01)
*H04N 21/438* (2011.01)
*H04N 21/472* (2011.01)
*H04N 21/61* (2011.01)
*H04N 21/643* (2011.01)
*H04L 1/00* (2006.01)
*H04N 7/173* (2011.01)
*G10L 19/005* (2013.01)

(52) U.S. Cl.
CPC ....... *H04N21/4382* (2013.01); *H04N 21/4384* (2013.01); *H04N 21/472* (2013.01); *H04N 21/6112* (2013.01); *H04N 21/64315* (2013.01); *G10L 19/005* (2013.01); *H04L 1/0002* (2013.01); *H04N 7/17318* (2013.01)

(56) References Cited

U.S. PATENT DOCUMENTS

| | | | | |
|---|---|---|---|---|
| 5,926,612 | A * | 7/1999 | Gillard et al. | 386/264 |
| 6,081,650 | A * | 6/2000 | Lyons et al. | 386/240 |
| 6,385,771 | B1 * | 5/2002 | Gordon | 725/90 |
| 6,480,541 | B1 * | 11/2002 | Girod et al. | 375/240.12 |
| 6,490,000 | B1 * | 12/2002 | Schaefer et al. | 348/553 |
| 7,565,289 | B2 * | 7/2009 | Rogers | 704/229 |
| 2002/0044757 | A1 * | 4/2002 | Kawamura et al. | 386/46 |
| 2005/0213668 | A1 * | 9/2005 | Iwabuchi et al. | 375/240.27 |
| 2006/0277582 | A1 * | 12/2006 | Kiiskinen et al. | 725/89 |
| 2009/0016448 | A1 * | 1/2009 | Matsumoto | 375/240.28 |

FOREIGN PATENT DOCUMENTS

| | | |
|---|---|---|
| WO | WO9522233 | 8/1995 |
| WO | WO03048900 | 6/2003 |

OTHER PUBLICATIONS

Prerau, Michael J., Slow Motion Sound: Implementing Time Expansion/Compression with a Phase Vocoder, Dec. 16, 2002, retrieved from http://www.music.columbia.edu/~mike/publications/PhaseVocoder.pdf on Feb. 29, 2012.*

Mahfuz, Ejaz, Packet Loss Concealment for Voice Transmission over IP Networks, Sep. 2001, McGill University, retreived from http://www-mmsp.ece.mcgill.ca/mmsp/theses/2001/mahfuzt2001.pdf on Feb. 29, 2012.*

International Search Report for PCSIB2007/002689, completed Apr. 18, 2008, mailed Jul. 22, 2008.

Written Opinion of the International Searching Authority and International Preliminary Report on Patentability, dated Feb. 11, 2009.

Nikolaos, Laotaris et al: Instrastream Synchronization for Continuous Media Streams: A Survey Playout Schedulers, IEEE Network, IEEE Service Center, NY, NY, US, vol. 16, No. 3 May 2002.

* cited by examiner

METHOD FOR REPRODUCING AN AUDIO AND/OR VIDEO SEQUENCE, A REPRODUCING DEVICE AND REPRODUCING APPARATUS USING THE METHOD

The present invention refers to a method for reproducing an audio and/or video sequence, as well as a reproducing device and reproducing apparatus using the method.

Modern audio-video digital receivers are able to receive a large number of audio-video services, which are essentially constituted by audio-video sequences.

The user often does the so called "zapping", i.e. sequentially selects many services until the desired one has been found; the user wants to very quickly switch (e.g. in one or two seconds) from one service to another (e.g. by means of a remote control of the receiver) so as to be able to rapidly examine a great number of services; it is therefore important that the receiver can satisfy the needs of the user. As it shall result in the following, the present invention is particularly advantageous in the case of mobile receivers.

One of the most used ways for obtaining a reliable communication of digital data on noisy time-variant channels (wherein the signal-to-noise ratio is changing over time e.g. due to the movement of the receiver) is that of interleaving the transmitted data blocks in combination with the use of error correction codes (FEC=Forward Error Correction), such as the known BCH, Reed Solomon, and LDPC codes.

In particular, certain types of transmission channels may be occasionally affected by impulsive noise; in other cases, particularly in the case of mobile reception, the signal may undergo non frequency-selective attenuations, due to the presence of obstacles, or frequency-selective attenuations due to signal reflections (multi-path propagation). In such conditions, long sequences of consecutive bits can be altered ("burst" errors), resulting in loss of effectiveness of the error correction code for recovering the original sequence. In such cases the data blocks are normally interleaved, so that, when the receiver performs the inverse process of interleaving, for placing the data back in the original order (in the following: de-interleaving), the effect of a possible error sequence ("burst") is uniformly distributed inside the block (in the following interleaving block); in this way the probability decreases that bits affected by errors are consecutive, and the probability increases that the application of the error correction code (FEC) leads to the reconstruction of the original sequence. The greater the size of the interleaving block, which shall be many times greater than the maximal duration of the error bursts, the more effective the process is.

A typical method of realizing the interleaving process is that of writing the codewords into a matrix of predetermined size, inserting them vertically column after column, and reading them again horizontally line-by-line. It is clear that the greater the size of the matrix, the more distant are the consecutive errors generated in the transmission channel.

In particularly critical transmission channels, it is necessary to use large-sized interleaving blocks in order to obtain a reception with a low error rate, consequently accepting high delay periods in the reception process, for instance this is the case of reception by mobile receivers of satellite transmitted signals. In such a case, due to the low level of the received signals, any obstacle (building, tree, bridge, tunnel, pylon, etc.) which is located between the receiving antenna and the satellite, strongly reduces or nullifies the received signal level, causing interruptions that can last even a few or many seconds.

In order to correct this kind of interruption, the interleaving block shall be of such a size that the number of erroneous data is only a "moderate" portion of the contained data, depending on the correction capability of the adopted code. Let us assume, for instance, that a linear block code is used, able to correct a percentage $\epsilon=25\%$ of erroneous data in each interleaving block. This implies that, in order to obtain an acceptable percentage of errors in the reception process, the duration of the transmission of the interleaving block shall be at least 4 times greater than the duration of the longest interruption.

For instance, let us assume that the system is coding a single audio-video service with a bit rate $R_s=0.15$ Mbit/s, and let us assume that we want to recover error bursts on the channel having a maximal duration $T_{burst}=2.5$ seconds. If the adopted FEC code, with an efficiency rate $\eta=0.75$, allows to recover $\epsilon=25\%$ of erased bits, a corresponding interleaving is necessary, which acts on the bits transmitted over the channel for a time $T_1>(T_{burst}/\epsilon)=10$ seconds ($T_1$ will be indicated in the following as interleaving time), therefore the minimum interleaving block is equal to $M=T_1 R_s/\eta=2$ Mbit.

A similar situation occurs in the case of time division multiplexing transmission systems, where S audio-video services are combined in one single data flow (e.g. MPEG transport multiplex), and the data are transmitted over the channel at a multiplex bit rate $R_m$ equal to $\Sigma_{i=1,\ldots,S}\{R_s(i)/\eta\}$ (if all the services have the same bit rate $R_s$, and if we ignore possible additional signaling data, then $R_m=S\,R_s/\eta$). For instance, $S=20$, $R_s/\eta=0.2$ Mbit/s, $R_m=4$ Mbit/s. In such cases the interleaving block and the FEC are typically applied to every single service (rather than to all the S services after the multiplexing), for reducing the interleaving buffer size and the operating clock rate of the FEC decoder (in fact the user watches a single audio-video service at a time, and it is not necessary to correct the errors in all the S services).

Figure 3:
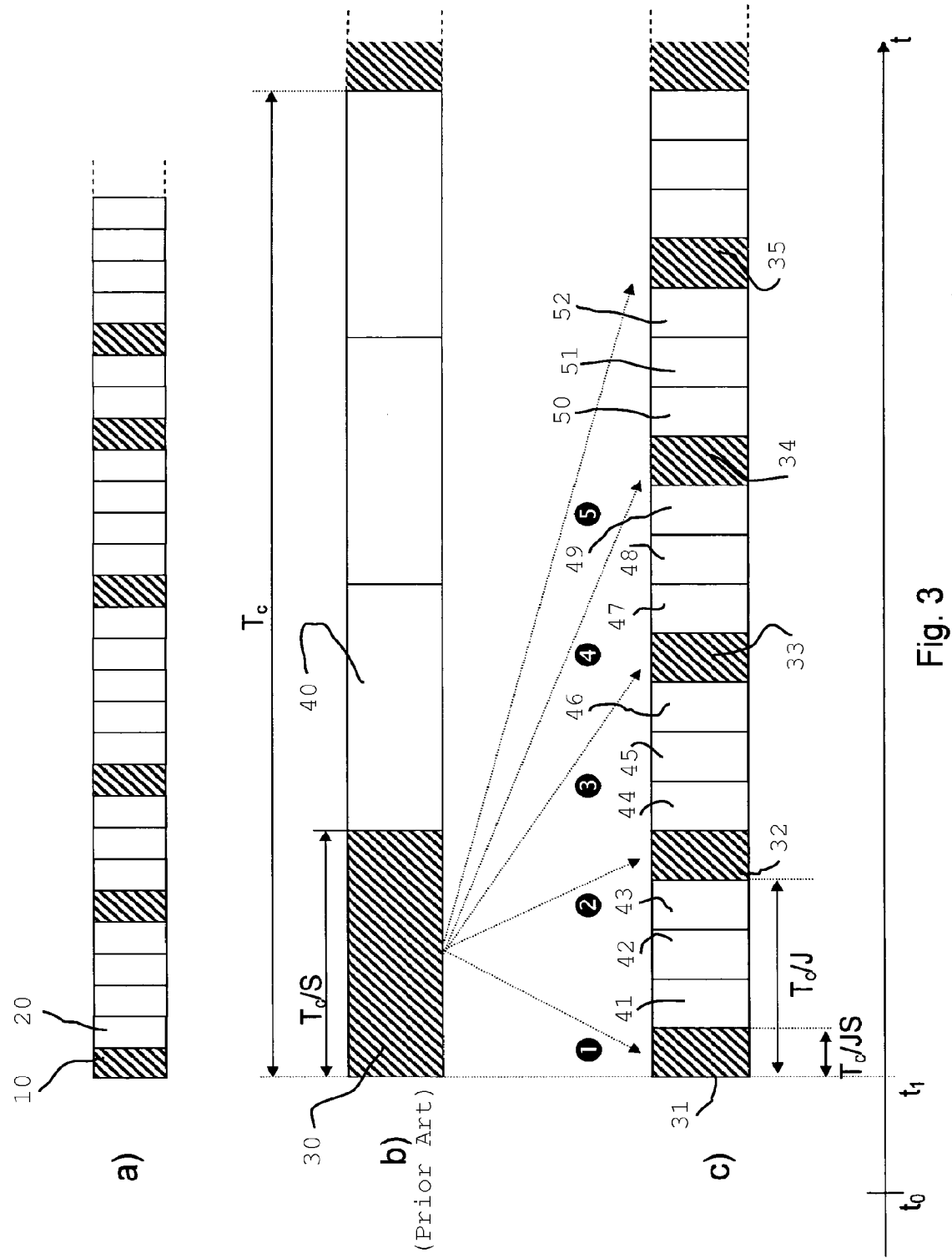

In this case the capability of correcting the error bursts depends not only on the size M of the interleaving block, but also on the multiplexing process. FIG. 3(a) shows in a time scaled diagram the case wherein the multiplexing uniformly distributes over the channel the bits pertaining to the different services: every hatched square 10 represents a packet carrying the data corresponding to a given service, while the solid ones 20 correspond to the remaining S-1 services. In this case, an error burst on the channel (with the maximal duration Tsub.burst, but affecting S times as many bits due to the increased transmission rate) uniformly affects several services and therefore we have the same situation as the case of the system which transmits only one service: T.sub.1=M/(R.sub.s/.eta.) must be greater than T.sub.burst/.epsilon.. In the following the expression "sufficiently uniform" time division multiplexing will refer to a multiplexing which, in the typical period of the error bursts on the channel (T.sub.burst), transmits packets of bits pertaining to all the services, and the number of packets pertaining to a given service is proportional to its bit rate. This cannot be applied to the case of "Time Slicing", as described in detail in the following.

One of the drawbacks of the interleaving technique, apart from the additional complexity of the receiver due to the de-interleaving buffer, is that a delay period is introduced in the receiver between the beginning of the data reception and the corresponding FEC decoding: in fact the receiver shall receive and store the entirety of the interleaving block, before initiating the FEC decoding. Therefore every time the user selects a new audio-video service the receiver shall load all the interleaving block in an internal memory (in the following de-interleaving buffer or simply buffer) and correct the erroneous audio-video data carried in the information section by means of the data carried in the error correction section (FEC), before starting to decode the information section in order to generate the audio-video signal. In the case of large blocks this can lead to unacceptable delays for the user, who, while browsing and selecting the services ("zapping"), has to wait several seconds (in the example, $M/(R_s/\eta)=10$ seconds) before seeing the images on the screen and hearing the audio (for the sake of simplicity the delay for decoding the audio-video signals is not considered).

An immediate solution to the problem of the amount of time needed during zapping could be that of using S buffers of size M, so as to contain the interleaving blocks of all the services; of course it would be necessary a memory S times greater in the receiver, with the consequent increase in cost (the inapplicability to the "Time Slicing" case will be discussed later).

A typical example of application of the interleaving technique in combination with the Reed Solomon code is described in the technical standard ETSI EN 302 304 (DVB-H="Digital Video Broadcasting-Handheld"), which refers to the technical standard ETSI EN 301 192 and is used for broadcasting television signals to mobile receivers. In this standard, the maximal size of the interleaving block is M=2 Mbit, and can be applied to each one of the tens of services, which can compose the MPEG multiplex transmitted over a radio-frequency channel (the entire multiplex can reach a transmission bit rate $R_m$ ranging from a few Mbit/s till a few tens of Mbit/s, and equal to $[S\,R_s/\eta]$ in the simplified case mentioned above of S services each one at the same bit rate $R_s$). FIG. 1 shows the diagram of the interleaving and FEC used in the above mentioned technical standards.

Moreover there are a few transmission systems that make use of the technique called "Time Slicing", such as the above mentioned technical standards: a data block pertaining to a given service (or group of services) is transmitted at the maximal bit rate permitted by the channel (R.sub.m) at known time intervals ("Time Slice") according to a periodic cycle, during which the receiver that is tuned into said service is active. In the remaining time intervals, when the other services (or group of services) that are transported in the multiplex are transmitted, the receiver is deactivated, thus considerably reducing the battery consumption (up to e.g. 90%). In the DVB-H standard the data transmitted in a Time Slice correspond to the interleaving block of the Reed Solomon code, as shown in FIG. 3(b), where the hatched blocks 30 represent blocks of data pertaining to the same service, while the solid ones 40 represent the other S-1 services. This type of configuration implies the following consequences:

(a) An interleaving block (in the specific case of the maximal size of M=2 Mbits) is transmitted in a very short time at the maximal rate permitted by the channel R.sub.m (e.g. T.sub.1=M/R.sub.m=0.5 seconds if R.sub.m=4 Mbit/s), and therefore in the reception process the interleaving efficiently distributes error bursts lasting T.sub.burst<.epsilon.T.sub.1=0.125 seconds, where .epsilon.=0.25 (which is an insufficient value, as previously indicated, in the case of reception of satellite signals). In other words, compared to the case without Time Slicing, the interleaving time is reduced by a factor of S for the same size of the buffer M. In the case of the DVB-H standard, this disadvantage is not considerable on the typical reference channels (terrestrial VHF/UHF channels, where the FEC is used for counteracting high Doppler frequencies, which cause interruptions lasting tens of ms). (b) The de-interleaving memory of the receiver is loaded at the rate R.sub.m being much greater than the bit rate of the single service R.sub.s/.eta. (R.sub.m=S R.sub.s/.eta., if all the S services are transmitted at the same bit rate R.sub.s/.eta.). However this does not solve the above mentioned problem of the delay periods that occur when zapping, due to the loading time of the de-interleaving memory. In fact in the case of Time Slicing the transmission takes place cyclically with the other S-1 services, while the user randomly changes from one service to another, and therefore the maximum time needed for having access to a service equals the duration of the cycle (in the example above the cycle lasts Tsub.c=M S/R.sub.m) plus the (irrelevant) loading time of the buffer M/R.sub.m. For instance, if the multiplex transports S=20 services, each one at a bit rate of 0.150 Mbit/s, .eta.=0.75, R.sub.m=4 Mbit/s, M=2 Mbit, then the cycle lasts M S/R.sub.m=10 seconds similar to the case of a loading time of the interleaving memory at a "continuous" rate R.sub.s/.eta. (in the example above, M/(R.sub.s/.eta.)=10 seconds). In the case of Time Slicing, the average zapping time equals Tsub.c/2 (i.e, in the example, 5 seconds) plus the time necessary for loading the buffer, equal to M/R.sub.m. As in the above case of continuous transmission, an immediate solution of the zapping time problem is that of using a buffer of size M.times.S, i.e. apt to contain the interleaving blocks of all the services; however the advantage ensuing from the use of Time Slicing, i.e. the reduction of battery consumption, would be lost (the receiver would be always on) and, obviously, an amount of memory S times greater would be necessary in the receiver, with the consequent increase in cost.

In conclusion, the Time Slicing technique, as performed in the above mentioned technical standard and in other transmission systems, allows for a reduced battery consumption, but offers a limited exploitation of the interleaving memory M over channels characterized by long interruptions and implies high zapping times (in the example above, the duration of the slicing cycle equals $T_c$=M S/$R_m$).

It is common practice to use the technique called "virtual interleaving" (see the above mentioned technical standards), so that the transmitted audio-video data are neither altered nor mixed by the interleaving process. Such technique consists in applying the interleaving for calculating the error correction data, e.g. using a systematic block coding such as the Reed Solomon code (please note that a systematic code does not modify the useful data), and then reconstructing the original audio-video flow sequence through de-interleaving before the transmission, while the error correction data are transmitted separately. Provided that the reception conditions are not critical, the virtual interleaving allows for a simplified receiver to decode the information data (audio-video flow) by simply ignoring the error correction data of the FEC code. In the case of FEC with virtual interleaving, the receiver requires a buffer of size M, carrying out the interleaving process (and not that of de-interleaving) for allowing the FEC to perform the correction on the audio-video information codes.

Document US2005/0213668 describes a system wherein, in the transmission of a moving picture, when the user switches video sources (for example, switches channels or starts reproducing a recorded program), the selected video source can be swiftly started to display. Immediately after a delivery apparatus makes a video source be selected by switching, a receiving apparatus causes a selector to select the video packets transmitted not through an error corrector and to supply them to a decoder and it controls the decoder to generate a frozen frame from the video packets and to supply it to a display where it is displayed. The selector is controlled to produce the error-corrected video data after a counter counts a delay time that the video packets undergo in the error corrector.

The general aim of the present invention is that of carrying out a method that allows a receiver to immediately reproduce an audio and/or video service selected by the user; typically the present invention will be applied to audio and/or video services. This aim is obtained through the reproduction method as described in the attached claims, which have to be considered as an integral part of the present description.

The basic idea of the method according to the present invention consists in providing two operation modes; a transitory one wherein the error correction data are not used ("low protection reception") and a steady state one wherein the error correction date are used ("high protection reception").

The transitory operation mode is typically used immediately after the user has selected a sequence, i.e. a service, so as to immediately reproduce it.

The steady state operation mode is used afterwards (if the user has not selected in the meantime another service).

In particular, the reproduction can start before the interleaving buffer is fully loaded (assuming that a FEC and a virtual interleaving is used by the transmitter) and then switching to the "high protection" condition with interleaving and FEC, assuring also the continuity of reproduction of the audio-video signal.

In the case of transmission of a single service or a multiplex of S "sufficiently uniform" services (without Time Slicing, as shown in FIG. 3(a)), the method can only be implemented in the receiving device, without making any changes to the transmission apparatus and without any modification to the telecommunication standards in use.

The invention can also be used in combination with the Time Slicing technique, by introducing suitable modifications to the transmitting system as will be shown later, with the additional advantage of better exploiting the interleaving memory, and the consequent improvement of the error correction performance over channels affected by long interruptions (for instance the channel of mobile reception by satellite).

The said method takes advantage of the virtual interleaver characteristic of maintaining the audio-video data unaltered so as that the audio-video data of a service are immediately accessible to the receiver.

In the case of transmission of a single service at the bit rate $R_s/\eta$, or of the transmission of S services in multiplex at the bit rate $R_m$ (without Time Slicing), the method according to the present invention provides, upon zapping, to supply the audio-video decoder with the data flow that has not been corrected by the FEC code (in the following "uncorrected flow") without waiting for the loading of the interleaving block, so as to immediately show the user the video and/or audio sequence (negligible zapping time), and switching to the flow corrected by the FEC code (in the following "corrected flow") at a second suitably chosen time, starting from the time when the interleaving buffer is fully loaded. If the two said flows, corrected and uncorrected, were read at the same rate $R_s/\eta$, equal to that of the incoming data, they would have a time delay equal to $M/(R_s/\eta)$ (neglecting the possible FEC decoding delay) but in any case the method described in the following allows for eliminating such a delay at the time of switching from the uncorrected flow to the corrected flow, in order to avoid annoying interruptions or repetitions of the audio-video signal.

In the case of transmission of several services in the multiplex with the use of Time Slicing, the method according to the present invention can be applied, but it is advantageous to introduce a modification of the slicing cycle used in the present systems, e.g. in the technical standard DVB-H, as shown in the FIGS. 3(b) and 3(c). According to said modification, the interleaving block of size M is not transmitted in a single Time Slice, but it is split into J mini-blocks of size M/J (equal to complete numbers of columns of the interleaving matrix), where J is an integer chosen so as to suitably reduce the slicing cycle time based on the characteristics of the channel (interruptions duration) and the characteristics of the receiver (re-synchronization time) as explained in more detail in the following. The mini-blocks of the S services are cyclically transmitted so as to create J sub-cycles of period $T_c/J$, as shown in FIG. 3(c) (specific case J=5, S=20, $T_c$=10 s). Therefore the interleaving buffer of the receiver is loaded in J intervals, and if the method according to the present invention is used the delay period after zapping equals in the worst case $T_c/J$ (2 seconds in the example), and equals $T_c/2J$ on average (1 second in the example), with a reduction of a factor J compared to a conventional receiver in the case of a reception without errors.

It is to be noted that J shall be chosen as high as possible (for reducing the zapping time) while keeping the transmission time of each service over the channel ($M/JR_m$) long enough (not less than the re-synchronization time of the demodulator/receiver after it switches off, e.g. a few hundred milliseconds) in order to maintain the energy saving of the Time Slicing high. In fact in a Time Slicing sub-cycle lasting $MS/JR_m$ the receiver must be kept on for a time $T_{sync}+M/JR_m$ and the battery life saving equals $(T_{sync}+M/JR_m)/(MS/JR_m)$.

It is to be noted that the splitting of the Time Slicing cycle into J sub-cycles is highly desirable also in order to improve the reception performance over a channel showing long random interruptions of the signal. In fact, in the example of FIG. 3(b), 2 Mbit blocks are transmitted for 0.5 seconds: if during such interval a signal interruption of 2 seconds takes place, the Reed-Solomon code would not be able to reconstruct the original sequence transmitted. In the case of FIG. 3(c) a service is transmitted in five 400 kbit sub-blocks of 100 ms each. The 2 seconds interruption on the channel would erase only 20% of the bits of each service, with the possibility of a perfect correction by the Reed Solomon FEC.

The elimination of the delay between the uncorrected and the corrected flow is obtained by reading and sending to the audio-video decoders the uncorrected data stored in the interleaving buffer at an average rate $R_s'(t)$ lower (e.g. by 10% or 20%) than the average rate $R_s$ used in the steady state operation mode. The switching to the corrected flow takes place after the alignment of the two flows has been reached (in any case after the interleaving buffer has been fully loaded and the activation of the FEC). From this moment on, the audio and video data are read and decoded at the normal rate $R_s$ from the corrected flow.

The decoding rate of the audio-video data takes place synchronously with the reading of the data stored in the buffer, according to one of the methods known to the expert in the field: in this case, before the switching to the corrected flow, the decoding rate is slightly reduced to the value $R_s'(t)$, with a (negligible) slowing down of the images and audio rate after the decoding, so as that the result is neither perceivable nor disturbing to the user. In order to obtain a continuous reproduction of the decoded video signal it is advantageous to modify, during the transitory period, the generation mechanisms of the image rate, by means of known techniques to the skilled in the art.

In another embodiment of the invention, a frequency transformation is applied to the audio data read and decoded with a reduced rate so as to hide from the user the pitch change of the audio signal, according to one of the known methods.

According to further aspects, the present invention also relates to a device for reproducing sequences and an apparatus for reproducing sequences, which use the method according to the present invention.

Other aims, characteristics and advantages of the present invention will be clarified in the following description.

Figure 2:
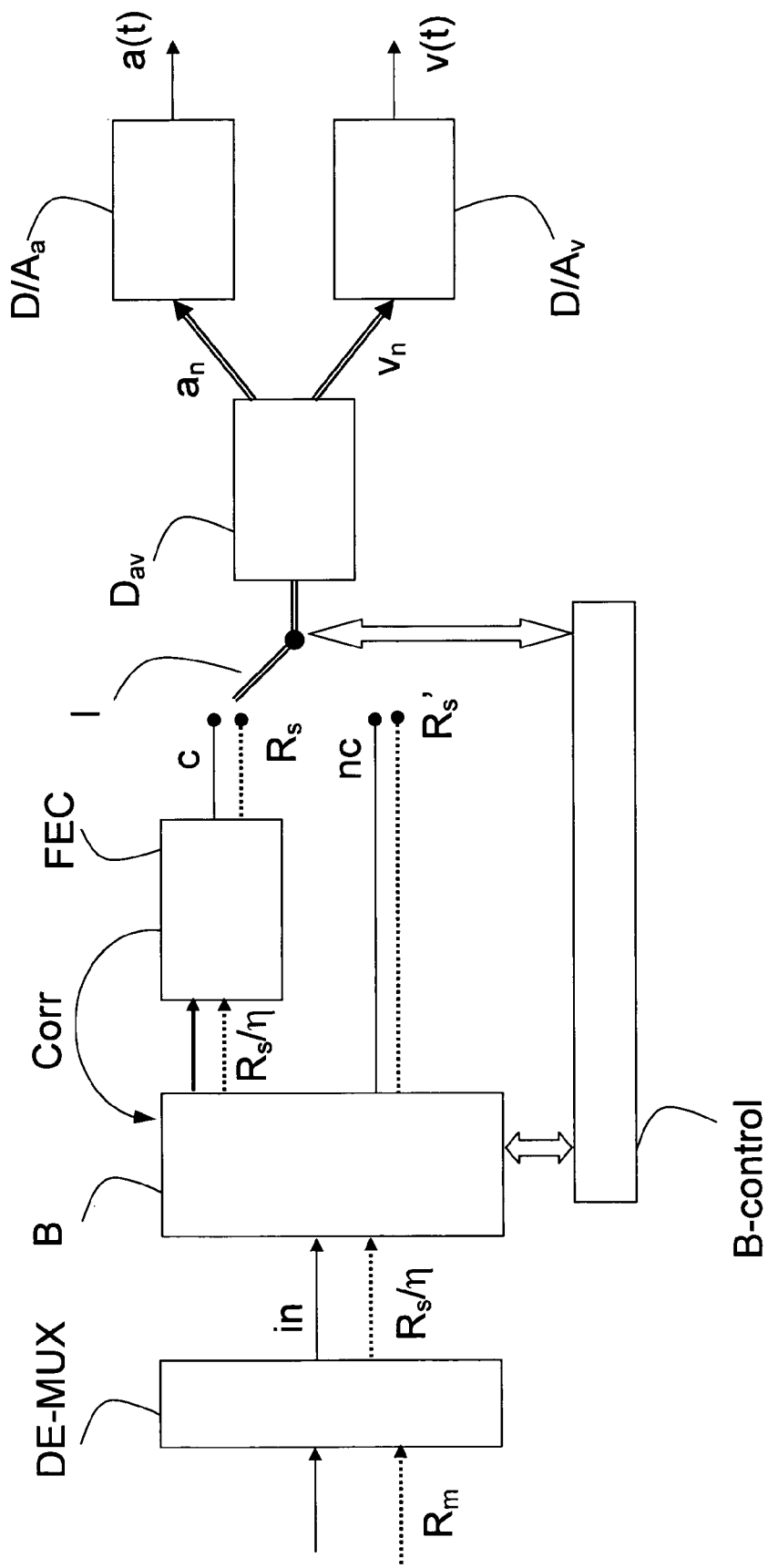
Figure 4:
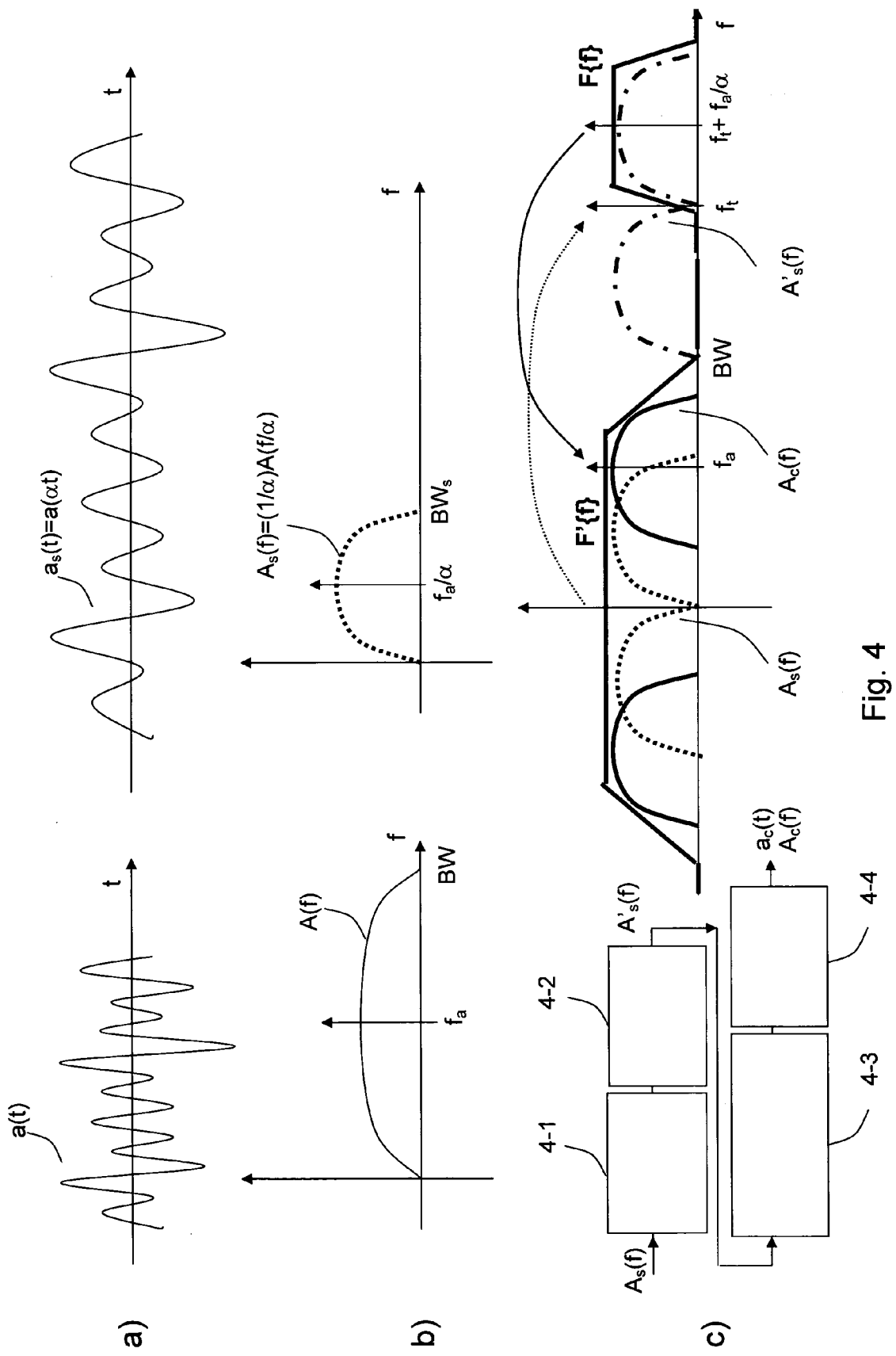
Figure 5:
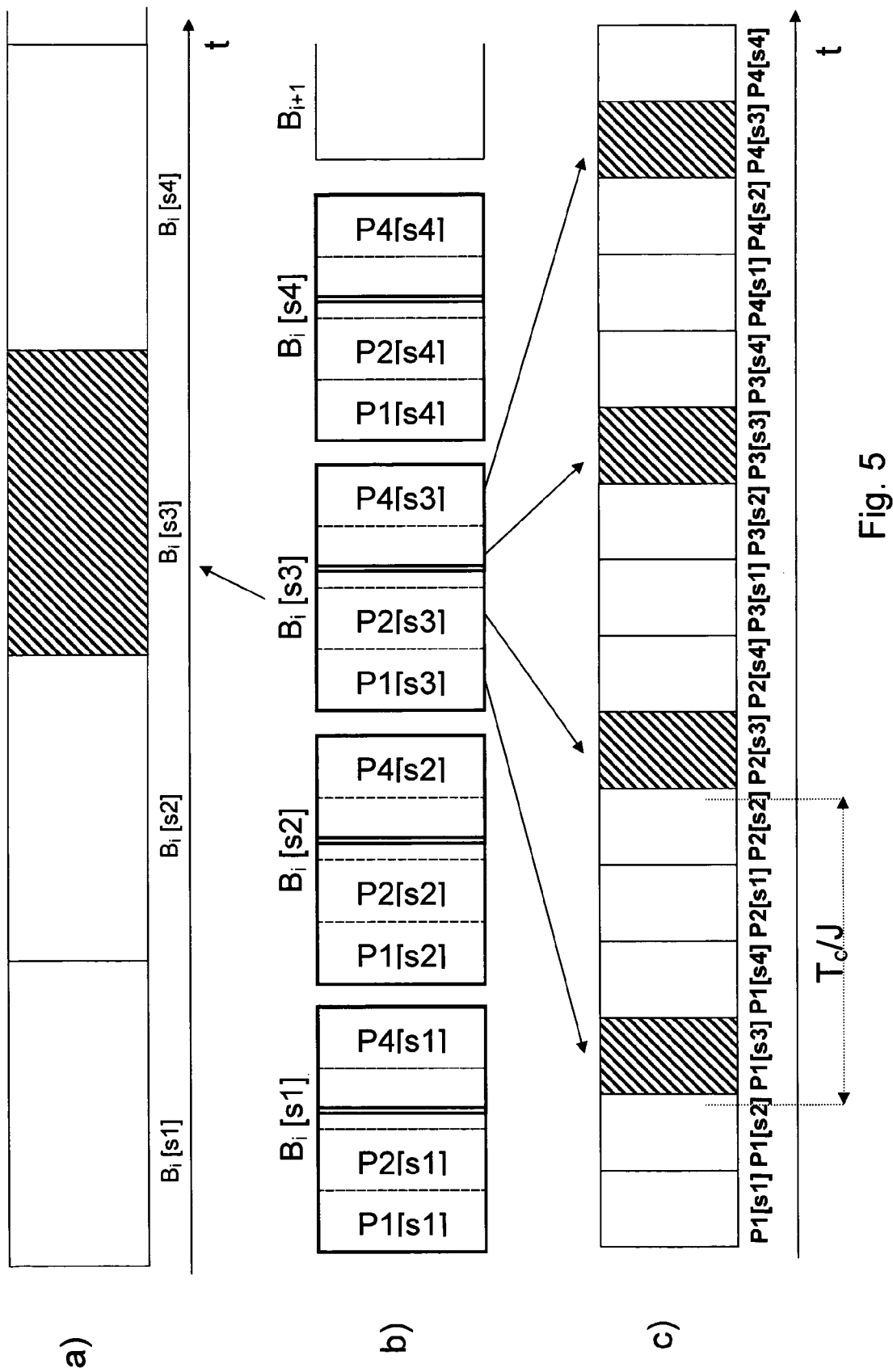

For a better understanding of the invention, examples of embodiments of the invention are described in the following, which shall be considered only as non-limiting examples, in connection with the attached drawings wherein:

FIGS. 1a and 1b represent a possible interleaving method, known from the state of the art, FIG. 2 is a conceptual diagram of the method according to the invention, FIG. 3(a) is an example of time division packet multiplex (packets randomly inserted by the transmitter). In the case of an MPEG Transport Stream multiplex the packet size is 188 bytes FIG. 3(b) shows a conventional Time Slicing cycle, as adopted in the DVB-H standard: in every Time Slice the data of an interleaving block pertaining to one single service (or a group of services) are transmitted (e.g. for M=2 Mbits about one thousand MPEG packets are transmitted), FIG. 3(c) shows the Time Slicing cycle modified in order to make the invention applicable, wherein an interleaving block of a single service is split into J mini-blocks (31, 32, 33, 34, 35), alternatively transmitted in a periodic way together with the mini-blocks of the other services (41, 42, 43, 44, 45, 46, 47, 48, 49, 50, 51, 52), FIGS. 4(a) and 4(b) show the frequency spectrum variation of an audio signal after it has been slowed down, and FIG. 4(c) is a diagram showing the possible correction, which can be applied in order to mask the lowering of the pitch, and FIG. 5 show the Time Slicing transmission of four audio-video sequences or services according to the state of the art and according to an aspect of the present invention.

In FIGS. 1a and 1b a diagram is shown illustrating the interleaving method as used in the DVB-H standard for the transmission of audio-video signals to mobile terminals. In this standard a protection system is introduced at the MPE [Multi-Protocol Encapsulation] protocol layer, by adding error correction data (FEC), obtained using a linear block code of the Reed-Solomon type; such correction data are calculated starting from the information data such as the IP (Internet Protocol) packets.

Said error protection data are added to the data flow of each single "audio-video service" supplying the MPEG packet multiplexer (ISO/IEC 13818—parts 1 and 2—packet multiplexer: "Information technology—Generic coding of moving pictures and associated audio information"), which in turn assembles a number of services for the transmission over the same radio frequency channel.

The information packets are inserted into a matrix with a number $N_C$ of columns equal to the length of a Reed Solomon codeword, and a variable number $N_R$ of rows. Each element of the matrix carries a single information byte.

The matrix is vertically divided in two sub-matrices, the left sub-matrix ADT having a number $N_{CA}$ of columns and the right sub-matrix RSDT a number $N_{CR}$ of columns. On the transmitting side, the bytes of an integer p of information packets ID ($ID_1$, $ID_2$ ... $ID_p$) are inserted column by column in the sub-matrix ADT, and possible remaining elements of the sub-matrix are filled with padding information, e.g. zeroes (indicated as Pad in the figure).

In the sub-matrix RSDT error correction data are calculated on the basis of the information data of each row. Once the matrix has been filled in this manner, all the data are transmitted once again column by column: in this way the information data packets ID remain unaltered as do their order, while the $N_{CR}$ columns RSC (RSC1 ... ) of the sub-matrix RSDT, containing the error correction data, are transmitted in separated sections (FEC sections). For this reason the method is called the "virtual interleaving" method.

In the DVB-H standard the number $N_C$ of columns is 255, $N_{CA}$ is 191 while $N_{CR}$ is 64, therefore the Reed Solomon code parameters are (n=255, k=191, n−k=64) $\eta=k/n\approx0.75=\frac{3}{4}$ and the code is able to correct up to 64 erroneous bytes ($\epsilon=25\%$), the positions of which are known (in fact an error indication code—CRC—indicates which columns contain errors). The maximal number of rows is 1024, equal to $M=2^{21}$ bits=2 Mbit.

By increasing the size of the Pad zone in the sub-matrix ADT it is possible to strengthen the Reed Solomon code (in fact the percentage of the parity data increases): the padding bits are used for calculating the error correction data, but they are not transmitted and are re-inserted by the receiver for performing the correction by means of the Reed Solomon code, as is known from the shortened codes theory.

On the other hand, by decreasing the number of columns in the sub-matrix RSDT (in other words, not transmitting a part of the error correction data) it is possible to weaken the code, in that the percentage of the error correction data is reduced, as is known from the "punctured" codes theory.

FIG. 1b schematically illustrates the transport of the data over the channel Ch; the MPE sections (MPE sect 1, MPE sect 2 ... ) comprising the data information packets, are transported over the channel in separate packets with respect to the FEC sections (FEC sect 1, FEC sect 2 ... ), which comprise the error correction data.

FIG. 2 is a conceptual block diagram of the method according to the present invention.

In the following description, for the sake of clarity, a hardware example of the invention is indicated, which operates on the bits, however it is to be considered that often the embodiments are software and/or operate on the bytes. The transposition from one implementation to another should not be difficult for the skilled in the art. In the case S services transmitted in a time division multiplex (without Time Slicing), the service selected by the user, indicated as 'in', is extracted from the data flow at a rate $R_m$ by means of a de-multiplexer (block DE-MUX). It comprises audio-video data and FEC error correction data (e.g. using the Reed-Solomon code) obtained by means of the method shown in FIG. 1.

This flow is stored byte by byte, column by column, in the interleaving buffer (the process is shown in block B of FIG. 2 and corresponding to the method in FIG. 1) at an average rate of $R_s/\eta$ bit/s, under control of the block B-CONTROL, which generates the writing addresses of the memory. When the beginning of a new block is detected, the writing addresses start from the bit {column=0, row=0}) increasing the column address from 1 to 8 (byte structure of the code) and then increasing the row address by one (and so on) every time a writing operation is performed.

From the instant $t_0$, when the user requests a new service, the receiver has to wait for the beginning of a new interleaving block at the instant $t_1$ and then starts loading the buffer, which continues until the instant $t_2$ ($t_2-t_1=T_B=M/(R_s/\eta)$, with an overall average delay ($T_B/2$)+$T_B$ and maximum delay 2 $T_B$).

The logic block FEC represents the row by row code correction process, which operates on buffer B after that it is fully loaded (i.e. from the instant $t_2$), by correcting the erroneous bytes after a maximal time $2T_B+T_{FEC}$, where $T_{FEC}$ is the FEC decoding delay, as functionally indicated by the arrow Corr in FIG. 2. At this point the block B-CONTROL reads the data from the buffer B byte by byte, column by column (by generating the reading addresses of the memory and increasing them by a single unit at every reading operation) and outputs an audio-video data flow on the branch c (corrected flow) at an average rate $R_s$ (the error correction data are not read).

The lower branch nc on the other hand, transports the data that have not been corrected by the FEC process (uncorrected flow), extracted from the buffer B byte by byte, column by column under the control of the block B-CONTROL with an average rate $R'_s = \alpha R_s$ (the error correction data are not extracted), where $0 < \alpha < 1$ is a suitably chosen factor. The more $\alpha$ is small, the more the uncorrected flow is slowed down, rapidly recovering the delay of the corrected flow on the branch c, but at the expense of a greater distortion of the reproduced audio-video signals (experimental analysis shows that suitable values of $\alpha$ are located between 0.7 and 0.9).

Starting from the instant a new service is selected (instant $t_0$), the extraction of the data on the branch nc takes place immediately after being written in the buffer (without waiting for the beginning of an interleaving block): from the instant $t_0$ and until the detection of the beginning of an interleaving block—instant $t_1$—the writing and reading address generator is blocked on the cell {column=0, row=0} and the reading clock is hooked to the writing one, with a small delay in order to allow for the stabilization of the written data. The FEC bits are not extracted. After $t_1$ (beginning of the interleaving block), the reading clock is hooked to the writing one, with the characteristic of cyclically skipping a percentage of pulses equal to $1-\alpha$ (e.g. one pulse out of 10 if $\alpha=0.9$ is chosen, two pulses out of 10 if $\alpha=0.8$), while the writing and reading address generator increases them (byte by byte, column by column in the buffer B in FIG. 1) at every pulse of the corresponding clock. Obviously the address generator operates in a cyclical manner (modulo M), i.e. it starts again from the first cell every time it reaches the last one. In this way the reading address is progressively delayed with respect to the writing one, advancing at an average rate $R_s' = \alpha R_s$. When the writing clock operates on the FEC bits, the reading clock stops and waits for the useful data of the next interleaving block. In this way the data on the branch nc, that were initially (instant $t_1$) anticipated with respect to the data on the branch c, are progressively delayed, until they reach the alignment at the instant $t_3 = t_1 + [(T_B + T_{FEC})/(1-\alpha)]$ (if there are no errors on the channel, the two data are identical). For instance, if $\alpha=0.8$, $T_{FEC}=0$, $R_s/\eta=200$ kbit/s, M=2 Mbit, we obtain $t_3 = t_1 + 50$ seconds, where $t_1=10$ seconds (in the worst case).

Each time the user changes the service, the audio-video decoder $D_{av}$ is immediately connected to the uncorrected flow of the branch nc through the switch I of the FIG. 2. At a suitably chosen instant $t_s$ (as described later) the switch I switches to the corrected flow c.

In a simple embodiment of the invention, $t_s = t_1 + [(T_B + T_{FEC})]$ and $\alpha=1$. In this case the switching takes place immediately as soon as the buffer is fully loaded and the corrected branch starts to emit the (corrected) data. This choice allows the maximal speed of the switching to the corrected branch c, but its main disadvantage is that the reproduction of the audio-video data contained in the buffer (equal to 10 seconds of audio-video signal in the preceding example) is performed twice, with an effect which may be unpleasant to the user.

The switching from the "corrected" branch to the "uncorrected branch" may also take place based on a determined command of the user. For instance, the user could decide whether or not he/she likes the transition phase with a reduced decoding rate (i.e. slow reproduction if compared to the norm).

In a second main embodiment of the invention, $t_s = t_3$ so as that the signal on the branch nc is temporarily aligned with that on the branch c, and the switching does not cause jumps or repetitions in the audio-video reproduction. Consequently, if $\alpha=0.7-0.9$ and considering $T_{FEC}$ as negligible, the switching between the two branches may take place without repetitions of the audio-video sequence, after a time $t_s$ comprised between $t_1 + 3 T_B$ and $t_1 + 10 T_B$ (i.e. after about 40-110 seconds in the example where M=2 Mbits and Rs/$\eta$=200 kbit/s).

In another embodiment, the receiver is able to distinguish whether the received data are correct or erroneous for instance on the basis of the CRC error detection code (Cyclic Redundancy Check), that is already available in the technical standard DVB-H, for maximizing the correction capability of the Reed Solomon code; this situation is particularly advantageous because the receiver can continue the reproduction of the flow on the branch nc as long as the data are correct and until the alignment of the flows on the branches c and nc is reached, as mentioned above. If on the uncorrected flow an error is detected before the alignment between the delays of the two flows, (i.e. before $t_3$, but after $T_B$), then it may be desirable to switch to the reproduction on the corrected branch c, even at the expense of a repetition of the audio-video sequence and/or a temporary lack of reproduction (due to the fact that the corrected branch emits data only after the error correction data have been received and they have been applied to the information data).

The switching between the "uncorrected" and the "corrected" branches may be due to the fact that a number of errors have been detected greater than a predetermined threshold, or at least an error of a predetermined type, or, more generally, at least a predetermined condition has been verified, depending on the number and the type of the detected errors.

The switching between the "uncorrected" and the "corrected" branches may also be caused by a corresponding user command; e.g. during a "zapping" phase the "uncorrected" branch is used, and, when the user has selected the desired service, he/she sends a command for switching to the "corrected" branch and therefore the reproduction of the service with error correction and as a result being of a high quality.

In another embodiment of the invention, the factor $\alpha$ varies over time, having a low value (e.g. 0.7) at the instant $t_1$, and being progressively increased a few instants before the alignment of the two flows (e.g. firstly to the value 0.8 and then 0.9) so as that the variation of the audio-video signal reproduction speed is made progressively and therefore it is less noticeable to the user.

As mentioned above such switching from the "uncorrected" branch to the "corrected" branch takes place a relatively short time (several seconds, or at the most a few minutes) after the user has selected a new service.

However, according to the present invention, the switching may also take place after a much longer time; in fact, according to a particular embodiment of the invention, said switching takes place in general when at least a predetermined condition has been verified, which depends on the number and/or the type of the detected errors after the said selection; therefore, in conditions of very good reception of the sequence, said switching may, at best, not take place at all. There is a possibility of selecting a condition, which can be applied to a whole data block (i.e. the data of an interleaving matrix) and verifying the said condition for each received data block: as soon as the first data block with errors is received, the switching takes place to the "corrected" branch c, as mentioned above.

In particular, in the case described in the previous paragraph, we can envisage that the operation phase at a reduced decoding rate (i.e. reproduction at a reduced speed with respect to the norm) only starts if and when the said predetermined error condition has been verified.

As already stated, the diagram of FIG. 2 is conceptual and the FEC block acts on the uncorrected data contained in the buffer B generating a flow "c" of corrected data; a switch I is therefore provided, which conceptually switches from the uncorrected data flow "nc" to the corrected data flow "c".

According to a particular embodiment of the present invention, the FEC block can perform its error correction function directly on the data stored in the buffer. In this case the FEC block reads the information data (which may contain errors) and the error correction data contained in the buffer B, corrects the possible errors contained in the information data and writes the corrected data again in the buffer B. The decoder $D_{av}$ always receives data through the same electrical lines (without any switching); typically it initially receives uncorrected data (transitory operation), then mixed uncorrected and corrected data (intermediate operation), and finally only corrected data (normal operation).

From the previous description it can be noticed that the operation of FEC correction on the data contained in the buffer B takes place at the moment in which the buffer contains a complete block of data, and at said moment the reading address generator of the branch nc in the cycle j of the transitory phase is approximately pointing to the cell $[M \times (j\alpha)]$ mod M, while the cells $M-[M \times (j\alpha)]$ mod M of the same block are still to be read. For instance, if M=2 Mbit, $\alpha$=0.9 and j=6, the reading address at the moment of the FEC correction is $[M \times (j\alpha)]$ mod M=0.4 M, and therefore 60% of the cells of the block that have not yet been extracted on the branch nc are corrected (from these the parity cells of the Reed-Solomon code have to be subtracted). As time passes, a greater percentage of the data sent to the branch nc are corrected by the FEC, until 100% is reached at the moment of the alignment of the two sequences nc and c. From the above it is clear that in the embodiment described by way of example the switching between the data flows is not necessary, but it is possible to simply change (e.g. switch) the reading speed on the branch nc, switching from the reduced speed during the transitory phase to the normal operational speed when the delay has been reduced to zero and all the data have been corrected by the FEC.

Previously it was assumed that each data block comprised the data contained in the corresponding interleaving matrix.

However the present invention also applies to the case of a Time Slicing transmission.

In the case of Time Slicing, as mentioned above, it is appropriate to modify the transmission cycle $T_c$ by transmitting J mini-blocks of size M/J instead of interleaving blocks of size M, as shown in FIG. 3(c). In this case the description of the procedure performed in the receiver according to the invention is identical to the case of a transmission without time-slicing as described in FIG. 2, but in this case the packets pertaining to the selected service (after DE-MUX) are not received continuously but in J time intervals of a Time Slicing cycle ($T_c = MS/R_m$) during which the flow is received at the full speed of the channel $R_m$ (e.g. if J=5, then 5 mini-blocks are received within a cycle of 10 seconds, each block containing about 200 MPEG packets pertaining to the selected service; during the reception of a mini-block, the writing clock shall be equal to 4 Mbit/s). Such buffer loading intervals (which last $T_c/JS$ in the case of services at the same bit-rate, i.e. 0.1 seconds in the example of the FIG. 3(c)) are interrupted by delay periods (1.9 seconds in the example with S=20) corresponding to the transmission of the other S-1 services over the channel. Referring to FIG. 2, said process is now described, neglecting the functions which are the same as the previous case (without Time Slicing), while highlighting the timing differences and similarities. From the instant $t_0$ when the user requests a new service, the branch c has to wait for the beginning of a new interleaving block ($t_1-t_0=T_c$ maximum; $t_1-t_0=T_c/2$ average, equal to 10 and 5 seconds in the example), and then at the instant $t_1$ the loading of the buffer starts (size M as in the case without Time Slicing), which ends at the instant $t_2$ for a duration $t_2-t_1=T_B=[T_c/J][S^{-1}+(J-1)]$, with an average delay $(t_2-t_0)$ equal to $[T_c/J][(J/2)+S^{-1}+(J-1)]+T_{FEC}$ and maximum delay equal to $[T_c/J][J+S^{-1}+(J-1)]+T_{FEC}$ (i.e. 13.1 and 18.1 seconds in the example, assuming $T_{FEC}=0$). It is noted that for high values of J the relation $(t_2-t_1)=T_B \approx T_c=M/(R_s/\eta)$ is still valid, and therefore the total delay is similar to that of the case without Time Slicing. It is also noted that the present DVB-H technical standard uses the value J=1, resulting in an average delay $(t_2-t_0)_{med}=T_c[(½)+S^{-1}]$ and a maximal delay $(t_2-t_0)_{max}=T_c[1+S^{-1}]$, which in the case of the example reduces the zapping delays on the corrected flows by approximately 50% (5 and 10 seconds): in fact, transmitting the entire interleaving block at the rate $R_m$, the loading time of the buffer is negligible. The logic block FEC performs the code correction row by row on the block M (decoding delay $T_{FEC}$) and outputs on the branch c (corrected flow) an audio-video data flow at an average rate equal to $R_s$. On the other hand the lower branch nc transports the uncorrected data extracted from the buffer B at an average rate $R'_s=\alpha R_s$. Starting from the instant of the selection of a new service (instant $t_0$), the branch nc has to wait for the beginning of a new mini-block (maximal delay $T_c/J$ and average delay $T_c/2J$, equal to 2 seconds and 1 second in the example), and then starts emitting the data on the branch nc. As in the case without Time Slicing, after $t_1$ (beginning of the interleaving block), the reading clock of the buffer is hooked to the writing clock, skipping a percentage of pulses equal to $1-\alpha$, and proceeding at an average rate $R_s'=\alpha R_s$, until the re-alignment of the flows c and nc is reached at the instant $t_3=t_1+[(T_B+T_{FEC})/(1-\alpha)]$, wherein $T_B=[T_c/J][S^{-1}+(J-1)] \approx T_c=M/(R_s/\eta)$ where the last equation is valid for high values of J. In conclusion, the only functional difference in the case with Time Slicing is an initial delay $t_1-t_0$ of the data emitted on the branch nc equal to a maximum delay $T_c/J$ and an average delay $T_c/2J$ (for high values of J the difference becomes negligible): if J=1 were chosen as in the DVB-H standard the maximum delay of the branch nc would be equal to $T_c$ and very similar to the delay of the branch c, and therefore the invention would be innovative (from a technical point of view), but not useful (from a practical point of view). On the other hand implementing the invention with a high value of J (e.g. J=5) a zapping delay is achieved being about J times less on the uncorrected branch (and very much better performances on the corrected branch over channels subject to long interruptions for the same size of the buffer, as mentioned above).

The block $D_{av}$ represents the audio-video data flow decoding process as known from the prior art; this block separates the input data flow in the three flows: one relating to the control data, one relating to the compressed audio data, and one relating to the compressed video data (e.g. according to the MPEG-4/H264 standard); the audio and video data are processed in order to obtain the uncompressed audio and video data flows (respectively $a_n$ and $v_n$ in the figure). The block $D_{av}$ furthermore makes the data flows continuous (which in the preceding processes are discontinuous) as known from the prior art (by using buffer e phase locked loops—PLL—with suitable time constants) and moreover keeps the synchronization between the audio and video data flows.

At the output of the decoder, the audio $a_n$ and video $v_n$, samples are respectively sent to the digital to analog converters D/A$_a$ (audio) e D/A$_v$ (video), that respectively produce the analog signals a(t) (audio) and v(t) (video), to be respectively sent (typically through a suitable amplification) to the loudspeakers and the display means, not represented in the figure.

When the decoder is connected to the branch nc, the audio-video data flow enters at a rate R$_s$' lower than the rate R$_s$ present on the branch c in the steady state phase, therefore it is appropriate to slow down the reproduction of the audio and video data so as that they are presented to the user without interruptions.

For this purpose, the audio-video data decoding process D$_{av}$ should take place at a lower speed by a factor of α with respect to that used in the steady-state phase after the instant t$_s$, according to the prior art. In order to obtain a continuous reproduction of the video signal, it is appropriate to modify the parameters during the transitory phase, which control the synchronization of the frequency of the decoded picture (frame rate), thus preventing the video buffer emptying, according to known techniques.

The audio-video sequence would consequently be slowed down by a factor of α; it is clear that the more α is close to one, the less the user will notice the change of speed of the sequence after the switching time t$_s$.

In another embodiment of the invention, the receiver compensates for the frequency change of the audio signal during the time before t$_s$, so that the lowered tone goes unnoticed to the user.

In FIGS. 4(a) and 4(b) the process of spectrum changing for a slowed down audio signal is shown, as known from the mathematical transforms theory.

If a(t) is the output analog audio signal of the digital analog converter, which is obtained without slowing down the clock, the slowed down signal will be a$_s$(t)=a(αt). If A(f) is the spectrum of the signal a(t), with bandwidth BW and central frequency f$_a$, the frequency spectrum of the signal a$_s$(t) is consequently A$_s$(f)=(1/α)A(f/α), with bandwidth BW$_s$=αBW and central frequency f$_a$/α.

It is therefore clear that the slowing down of the audio-video sequence results in a change of the frequency spectrum of the audio signal, as represented in FIG. 4(b).

Experimental tests demonstrate that if, on the one hand, the slowing down of the video sequence is not particularly noticeable or disturbing to the user, on the other hand, the slowing down of the audio sequence may be much more noticeable to the human ear because of the lowered pitch. FIG. 4(c) illustrates an embodiment of the invention, wherein the receiver compensates for the lowered pitch of the audio signal by performing a frequency translation of the decoded audio signal a$_s$(t) or a$_n$ (acting in analog or digital), for bringing back the central frequency to approximately the central frequency f$_a$ of the original signal. This is obtained by means of two frequency conversions, the first one up to a frequency greater than the audio band BW, the second one down to the desired frequency f$_a$, by using known techniques. In particular the first frequency conversion is performed by way of a beat with a carrier of frequency f$_t$ (block 4-1 in the figure), followed by a band-pass filter F{f} (block 4-2), thus obtaining the signal with the spectrum A'$_s$(f). The second frequency conversion, on the other hand, is performed by way of a beat with a carrier of frequency f$_t$+{f$_a$[(α+1)/α]} (block 4-3), followed by a band-pass filtering F'{f} with a band BW (block 4-4), thus obtaining the desired signal having the spectrum A$_c$(f).

In another embodiment the pitch lowering is compensated by directly acting upon the digital signal: this is the case wherein the Time Domain Harmonic Scaling technique is used, or the Phase Vocoder technique, as known from the prior art.

It is worthwhile to mention that the problem of variation in speed of decoding a compressed audio or video signal (for instance according to the MPEG standard) while keeping the decoded audio and video flows synchronized has been considered and in part solved in the prior art.

It is moreover known how to change the pitch of an audio signal without changing its duration ("pitch shifting").

Concerning the "Phase Vocoder" technique, we can for instance refer to the article "Implementation of the digital phase vocoder using the fast Fourier transform" by Portnoff, taken from IEEE Transactions on Acoustics, Speech, and Signal Processing, Volume 24, Issue 3, June 1976, pages 243-248.

Concerning the "Time Domain Harmonic Scaling" technique, we can for instance refer to the article "Time-domain algorithms for harmonic bandwidth reduction and time scaling of speech signals" by Malah, taken from IEEE Transactions on Acoustics, Speech, and Signal Processing, Volume 27, Issue 2, April 1979, pages 121-133.

Furthermore, for implementing the present invention, it is interesting to consider the U.S. Pat. No. 5,583,652, concerning a method and a system for obtaining the continuous reproduction of an audio-video flow with a variable speed, controlled by the user, contemporarily assuring the audio and video flows synchronization. In the said system the Time Domain Harmonic Scaling technique is used for changing the reproduction speed of the audio flow without changing the tone thereof.

On the basis of the above, in general, the method according to the present invention is useful for reproducing an audio and/or video sequence (typically audio and video sequences) by means of a decoder able to decode the said sequence and a buffer located upstream with respect to the decoder being able to temporarily store at least a part of said sequence; the latter is transmitted through a number of data blocks, each one of said blocks comprising an audio and/or video information data section and a corresponding error correction data section. Typically said sections are transmitted in separate time intervals, in particular the information section is transmitted before the corresponding correction section; however this does not affect the present invention, as long as the error correction data are multiplexed with the information data leaving the information data unaltered. Therefore, the information data section and the corresponding error correction data section may be transmitted over the channel in a different order, within two or more time intervals, and may also be divided into several packets including, for instance, portions of the interleaving matrix that are not adjacent. For example, it is possible to alternate packets carrying information data (e.g. columns of the sub-matrix ADT of FIG. 1a) with packets carrying error correction data (e.g. columns of the sub-matrix RSDT of FIG. 1a).

The method includes a transitory operation mode and a steady-state operation mode; in the steady-state operation mode the information data of a block are corrected by applying the corresponding correction data of the said block before being supplied to the decoder; in the transitory operation mode the information data of a block are directly supplied to the decoder ignoring the corresponding correction data of said block.

As previously mentioned with reference to the described embodiments, in the steady state operation mode the information data are preferably decoded by the decoder at a nominal speed, while in the transitory operation mode the information data are decoded by the decoder at a lower speed than the nominal speed. Typically such speeds have to be considered as average speeds. However, what is important about such preferred characteristic is the audio and/or video data flow speed at the output of the decoder, and not the decoder's internal speed operation, which depends on the corresponding architecture.

Typically, the transitory mode is used after the audio and/or video sequence has been selected (by the user) for the reproduction and for a determined time interval, while the steady state mode is used after said time interval.

The above-defined method can generally be used, as previously mentioned, also in the case of "Time Slicing"; in this case the data blocks pertaining to the same sequence may not necessarily be contiguous; moreover the information sections and/or the correction sections may be advantageously split into blocks of different data.

The above-described method can generally be advantageously implemented inside a device for reproducing audio and/or video sequences; such a device can for instance constitute an electronic component fully or partly integrated in a microchip.

Such a device comprises a decoder able to decode the audio and/or video sequence and a buffer connected upstream to the decoder able to store at least a part of the sequence; means able to implement such method are also necessary; obviously in the device there shall be other elements, such as for example those shown in FIG. 2.

The above-mentioned means may be hardware and/or software; in particular, said means may be of the programmed type and comprise sections of code able to implement the method.

This kind of device may advantageously be used inside apparatus for the reproduction of audio and/or video sequences, such as for instance television receivers.

It is worthwhile noting that the previous brief description of the modification of a transmission in Time Slicing in itself constitutes an original innovation independently of the reproduction method according to the present patent application and previously described in detail.

Such invention has repercussions both on the transmission method (and the corresponding transmitter) and the reception method (and the corresponding receiver) as well as the structure of the transmitted signal.

FIG. 5b schematically illustrates four data blocks "B" (being of the same structure and size) pertaining to four services s1, s2, s3, s4 and to the time interval "i" and they are indicated by Bi[s1], Bi[s2], Bi[s3], Bi[s4]; as far as the time interval "i+1" is concerned, we can only partially see one block. Each block corresponds to an interleaving matrix, which, as shown in the figure, comprises a section of information data (on the left) and a section of error correction data (on the right); the two sections are separated by a double vertical line.

The transmission in Time Slicing according to the known art provides for transmitting the four blocks as a sequence (e.g. according to the order s1, s2, s3, s4) in successive "Time Slices" and for periodically repeating such sequence with period Tc, as shown in FIG. 5(a); each block constitutes a "data slice".

The transmission in Time Slicing according to the innovative technique proposed herein provides for dividing each block in "mini-blocks" (constituted by sets of data). In the example of FIG. 5 each block is divided in four equal portions; therefore, for instance, the block Bi[s3] is divided into the mini-blocks P1[s3], P2[s3], P3[s3], P4[s3] (the reference P3[s3] has been omitted in the figure for the sake of clarity and the portions are separated by thin vertical lines). As we can see in FIG. 5(b), a few mini-blocks (P1[s3] and P2[s3]) contain only information data, a mini-block (P4[s3]) contains only correction data and a mini-block (P3[s3]) contains both information data and correction data; said mini-blocks correspond exactly to a fraction of the interleaving matrix. Naturally, the mini blocks may be formed by taking portions of data contained in the original block in whatever order, without affecting the method of the present invention; for instance, a mini-block may contain portions of the interleaving matrix that are not adjacent.

The transmission in Time Slicing according to the innovative technique proposed herein provides for having in each "Time Slice" a "data slice" substantially corresponding to a mini-block, and that mini-blocks corresponding to different services cyclically alternate over time, as shown in FIG. 5(c).

The transmission in Time Slicing according to such innovative technique is advantageous be it from a "zapping" and an "error correction" point of view.

As far as "zapping" is concerned, thanks to the use of the mini-blocks, the receiver shall receive information data concerning any service over a maximum time corresponding to Tc/J (where J is the number of portions of each block). If the receiver never uses the FEC or is in an operation mode which omits the FEC (as previously described), the sequence concerning any service can be reproduced more or less immediately.

As far as the "error correction" is concerned, there are advantages in cases where long (and random) disturbances are present in the received signal. For instance, referring to FIG. 5, if Tc equals 8 seconds, and the transmission of a data block (a whole interleaving matrix) equals 8 seconds, and the transmission of a mini-block (a fourth of the whole matrix) equals 2 seconds, then a 10 seconds disturbance has very different effects in the case of a conventional transmission (FIG. 5(a)) compared to the case of the innovative transmission (FIG. 5(c)); in the first case the disturbance would probably affect a whole data block and would not be able to be recovered; in the second case, the disturbance would affect one or two mini-blocks of each one of the four services and could be probably recovered thanks to the FEC of the corresponding blocks.

The present invention considers the transmission of data blocks (in particular substantially corresponding to the data contained in an interleaving matrix) or of mini-blocks of data (in particular substantially corresponding to a portion of the data contained in an interleaving matrix).

It may be advantageous to provide that in the blocks and/or mini-blocks the initial image be encoded without reference to previous images; this image is generally called "I-picture" or "I-frame". Detailed information for implementing such a solution can be found for instance in the international patent application WO2006/031925 to which we refer.

All that has been described herein in relation to technical innovations shall not be considered in a limitative sense but merely as an example.

The scope and the extent of the present invention are therefore defined by the attached claims.

The invention claimed is:

1. Method for reproducing an audio and/or video sequence by means of a decoder able to decode said sequence and a buffer connected upstream to said decoder and able to temporarily store at least a part of said sequence, said sequence is transmitted by means of a number of data blocks, each of said blocks comprises a section of audio and/or video information data and a corresponding error correction data section, such sections being in particular transmitted in different time intervals, wherein the method comprises:

a transitory operation mode and a steady state operation mode, wherein in said steady state operation mode the correction data of one block are applied to the corresponding information data of said block before said information data are supplied to said decoder, wherein while in said transitory operation mode the information data of a block are directly supplied to said decoder ignoring the corresponding correction data of said block, and wherein in said steady state operation mode the information data are decoded by said decoder at nominal speed, and that in said transitory operation mode the information data are continuously decoded by said decoder at a speed greater than zero and lower than said nominal speed.

2. Method according to claim 1, characterized in that the information data of a block are supplied to said decoder before the reception of the section of information data of said block is completed.

3. Method according to claim 1, wherein said audio and/or video sequence is transmitted according to a method, which allows to detect errors, wherein in said steady state operation mode the information data are decoded by said decoder at nominal speed, and that in said transitory operation mode the information data are decoded by said decoder at first at said nominal speed and, after that at least a predetermined condition has been verified, depending on the number and/or the type of the detected errors, at a speed lower than said nominal speed.

4. Method according to claim 1, wherein the said audio and/or video sequence is transmitted according to a method which allows to detect errors, wherein if during a transitory operation interval time a number of errors is detected greater than a predetermined threshold, the supply of uncorrected information data to said decoder is avoided or interrupted and preferably the supply of corrected information data to said decoder is started when available.

5. Method according to claim 1, wherein said audio and/or video sequence is transmitted according to a method which allows to detect errors, wherein if during a transitory operation interval time at least one error of a predetermined type is detected, the supply of uncorrected information data to said decoder is avoided or interrupted and preferably the supply of corrected information data to said decoder is started when available.

6. Method according to claim 4, wherein when at least a predetermined condition has been verified, depending on the number and/or type of detected errors during said time interval, the supply of uncorrected information data to said decoder is avoided or interrupted and preferably the supply of corrected information data to said decoder is started when available.

7. Method according to claim 1, wherein said audio and/or video sequence is transmitted according to a method, which allows to detect errors, wherein said transitory mode is used after that the said audio and/or video sequence has been selected for reproduction and until at least one predetermined condition has been verified, depending on the number and/or type of errors detected after said selection.

8. Method according to claim 7, characterized in that said at least one condition refers to a data block of the sequence.

9. Method according to claim 7, characterized in that said at least one condition is repeatedly calculated on successive data blocks.

10. Method according to claim 1, wherein the said transitory mode is used after that said audio and/or video sequence has been selected for reproduction and for a determined time interval, and that said steady state mode is used after said determined time interval.

11. Method according to claim 10, characterized in that said determined time interval depends on the time needed for applying the correction data of one block to the corresponding information data of said block.

12. Method according to claim 10, wherein said determined time interval depends on the duration of reception and/or reproduction of a data block.

13. Method according to claim 10, characterized in that said determined time interval is equal to about $t_1+(T_B+T_{FEC})$, wherein $t_1$ is the time interval from said selection of said sequence to the reception of a block relating to said sequence, $T_B$ is the duration of reception of a block relating to said sequence, $T_{FEC}$ is the time necessary for applying the correction data of a block relating to said sequence to the corresponding information data of said block.

14. Method according to claim 10, characterized in that said determined time interval is equal to or greater than about $t_1+(T_B+T_{FEC})/(1-\alpha)$, wherein $t_1$ is the time interval from said selection of said sequence to the reception of a block relating to said sequence, $T_B$ is the duration of reception of a block relating to said sequence, $T_{FEC}$ is the time necessary for applying the correction data of a block relating to said sequence to the corresponding information data of said block, $\alpha$ is the ratio (less than one) between the information decoding speed in said transitory operation mode and the information decoding speed in said steady state operation mode.

15. Method according to claim 14, characterized in that said determined time interval provides for a number of time sub-intervals associated to different values of $\alpha$.

16. Method according to claim 14, wherein the value of $\alpha$ is progressively increased until it reaches the value of one.

17. Method according to claim 1, wherein the switching time from said transitory operation mode to said steady state operation mode depends on a user command.

18. Method according to claim 1, wherein the switching mode from said transitory operation mode to said steady state operation mode depends on a user command.

19. Method according to claim 18, characterized in that said user command relating to the switching mode specifies whether a decoding speed of the information data lower than the nominal decoding speed should be used.

20. Method according to claim 1, wherein the error correction data are calculated using a linear block code of the Reed Solomon type.

21. Method according to claim 1, wherein the error correction data are calculated starting from the rows of a matrix where the information data have been inserted column by column.

22. Method according to claim 1, wherein during the transitory operating mode a frequency translation is applied to the audio information data relating to said audio-video sequence decoded by the said decoder, said frequency translation shifting the mean frequency to its natural value.

23. Method according to claim 1, wherein during the transitory operating mode a frequency translation is applied to the analog audio signals deriving from the audio information data relating to said audio-video sequence decoded by said decoder, said frequency translation shifts the mean frequency to its natural value.

24. Method according to claim 1, wherein during the transitory operating mode a Phase Vocoder technique is applied to the audio information data relating to said audio-video sequence and decoded by said decoder.

25. Method according to claim 1, wherein, during the transitory operating mode, a Time Domain Harmonic Scaling technique is applied to audio information data relating to said audio-video sequence and decoded by said decoder.

26. Method according to claim 1 wherein each of the data blocks comprises the data contained in an interleaving matrix.

27. Method according to claim 1 wherein at the beginning of each of said data blocks an encoded image is included without reference to the previous images.

28. Method according to claim 1 wherein it comprises an intermediate operating mode, which follows said transitory operation mode and precedes said steady state operation mode.

29. Method according to claim 28, characterized in that in said intermediate operating mode mixed corrected and uncorrected data are supplied to said decoder.

30. Method according to claim 1 wherein said audio and/or video sequence is transmitted by means of a transmission technique in Time Slicing together with other audio and/or video sequences.

31. Method according to claim 30, wherein every data slice of the transmission in Time Slicing comprises a portion of the data contained in an interleaving matrix.

32. Method according to claim 31, wherein said portion of data comprises information data relating to an audio and/or video sequence.

33. Method according to claim 30, characterized in that said portion of data comprises correction data relating to an audio and/or video sequence.

34. Method according to claim 30, characterized in that said portion of data comprises a mixture of information and correction data relating to an audio and/or video sequence.

35. Method according to claim 32, wherein the data information slices of the transmission in Time Slicing comprise portions of data of different type.

36. Method according to claim 31, wherein the said portion is an exact fraction of said matrix.

37. Method according to claim 30, wherein at the beginning of each data slice of the transmission in Time Slicing an image is included that is encoded without reference to the previous pictures.

38. Method according to claim 1 wherein in said steady state operation mode the information data are extracted from said buffer at a nominal speed, and in said transitory operation mode the information data are extracted from said buffer at a speed lower than said nominal speed.

39. Method according to claim 38, characterized in that in said steady state operation mode the reading speed from said buffer is equal to the writing speed in said buffer, and that in said transitory operation mode the reading speed from said buffer is lower than the writing speed in said buffer.

40. Method according to claim 39, characterized in that the difference between the reading speed and the writing speed is obtained by cyclically skipping one or more pulses of a clock signal.

41. Method for reproducing an audio and/or video sequence, wherein said method comprises:

in a device comprising a decoder and a buffer, wherein said decoder is able to decode said sequence, said buffer connected upstream to said decoder and able to temporarily store at least a part of said sequence, said sequence is transmitted by means of a number of data blocks, each of said blocks comprises a section of audio and/or video information data and a corresponding error correction data section, such sections being in particular transmitted in different time intervals, providing a transitory operation mode and a steady state operation mode, wherein in said steady state operation mode the correction data of one block are applied to the corresponding information data of said block before said information data are supplied to said decoder, wherein while in said transitory operation mode the information data of a block are directly supplied to said decoder ignoring the corresponding correction data of said block, and wherein in said steady state operation mode the information data are decoded by said decoder at nominal speed, and that in said transitory operation mode the information data are continuously decoded by said decoder at a speed greater than zero and lower than said nominal speed.

42. The method of claim 41, wherein said device is hardware programmable with pieces of code.

43. The method of claim 41, wherein said device comprises a television receiver.

44. Method for reproducing an audio and/or video sequence in a device comprising a decoder and a buffer, wherein said decoder is able to decode said sequence, said buffer connected upstream to said decoder and able to temporarily store at least a part of said sequence, said sequence is transmitted by means of a number of data blocks, each of said blocks comprises a section of audio and/or video information data and a corresponding error correction data section, such sections being in particular transmitted in different time intervals, wherein said method comprises:

providing a transitory operation mode and a steady state operation mode, wherein in said steady state operation mode the correction data of one block are applied to the corresponding information data of said block before said information data are supplied to said decoder, wherein while in said transitory operation mode the information data of a block are directly supplied to said decoder ignoring the corresponding correction data of said block, and wherein in said steady state operation mode the information data are decoded by said decoder at nominal speed, and that in said transitory operation mode the information data are continuously decoded by said decoder at a speed greater than zero and lower than said nominal speed.

45. The method of claim 44, wherein said device comprises a television receiver.

* * * * *